United States Patent [19]
Stenlund

[11] Patent Number: 5,172,921
[45] Date of Patent: Dec. 22, 1992

[54] SEALING DEVICE

[75] Inventor: Stig Stenlund, Saltsjöbaden, Sweden

[73] Assignee: Flutron AB, Tyresö, Sweden

[21] Appl. No.: 887,664

[22] PCT Filed: Sep. 9, 1986

[86] PCT No.: PCT/SE86/00399

§ 371 Date: Mar. 25, 1987

§ 102(e) Date: Mar. 25, 1987

[87] PCT Pub. No.: WO87/01783

PCT Pub. Date: Mar. 26, 1987

Related U.S. Application Data

[63] Continuation of Ser. No. 323,124, Mar. 13, 1989, abandoned, which is a continuation of Ser. No. 46,061, Mar. 25, 1987, abandoned.

[30] Foreign Application Priority Data

Sep. 16, 1985 [SE] Sweden .......................... 8504286

[51] Int. Cl.$^5$ .............................................. F16J 15/00
[52] U.S. Cl. ............................ 277/237 R; 277/138;
277/165; 277/236

[56] References Cited

U.S. PATENT DOCUMENTS

| Re. 13,006 | 8/1909 | Hahn | 277/192 |
|---|---|---|---|
| 1,334,764 | 3/1920 | Kytlica | 277/195 X |
| 1,433,478 | 10/1922 | Rogatchoff | 92/172 |
| 1,532,938 | 4/1925 | Peeler | 277/220 |
| 1,546,625 | 7/1925 | Cook | 277/196 |
| 1,595,890 | 8/1926 | Taylor | 277/194 |
| 1,601,776 | 10/1926 | Sheiring | 277/236 X |
| 1,775,288 | 9/1930 | Malmberg | 277/144 |
| 2,591,230 | 4/1952 | Bertrand | 277/236 X |
| 2,591,920 | 4/1952 | Colvin | 277/216 |
| 2,877,070 | 3/1959 | Lee | 29/447 X |
| 3,123,367 | 3/1964 | Brummer et al. | 277/192 X |
| 3,268,235 | 8/1966 | Jacobellis | 277/165 |
| 3,328,041 | 6/1967 | Bloom et al. | 277/165 |
| 3,341,210 | 9/1967 | Vick | 277/165 |
| 3,385,543 | 5/1968 | Jakel et al. | 277/192 X |
| 3,418,001 | 12/1968 | Rentschler et al. | 277/165 |
| 3,515,393 | 6/1970 | Metcalfe | 277/96.2 X |
| 3,663,024 | 5/1972 | Traub | 277/165 |
| 3,704,019 | 11/1972 | McHugh | 277/96.1 X |
| 3,782,735 | 1/1974 | Novosad | 277/92 |
| 3,887,198 | 6/1975 | McClure et al. | 277/94 X |
| 3,921,988 | 11/1975 | Prasse et al. | 277/168 |
| 3,948,533 | 4/1976 | Novosad | 277/81 R |
| 4,101,140 | 7/1978 | Reid | 277/165 |
| 4,151,999 | 5/1979 | Ringel et al. | 277/165 |
| 4,194,745 | 3/1980 | McDougal | 277/236 X |
| 4,289,322 | 9/1981 | Traversari et al. | 277/193 X |
| 4,302,018 | 11/1981 | Harvey et al. | 277/236 X |
| 4,335,888 | 6/1982 | Ohba et al. | 277/96.1 |
| 4,421,329 | 12/1983 | Jelinek | 277/192 X |
| 4,592,559 | 6/1986 | Harvey | 277/176 X |
| 4,614,348 | 9/1986 | Fournier | 277/165 X |
| 4,659,092 | 4/1987 | Wallace et al. | 277/81 R |

FOREIGN PATENT DOCUMENTS

| 2432181 | 10/1978 | Fed. Rep. of Germany . | |
| 910655 | 6/1946 | France | 277/176 |
| 1101256 | 10/1955 | France | 277/165 |
| 2254990 | 7/1975 | France | 277/165 |
| 966561 | 8/1964 | United Kingdom . | |
| 1083933 | 9/1967 | United Kingdom | 277/165 |
| 1141049 | 1/1969 | United Kingdom | 277/96.2 |

Primary Examiner—William A. Cuchlinski, Jr.
Assistant Examiner—Daniel G. DePumpo
Attorney, Agent, or Firm—Pollock, Vande Sande & Priddy

[57] ABSTRACT

A sealing device for sealing between two cylindrical members including a sealing ring and at least one other element arranged in a sealing groove in one of the members. The sealing ring is pre-stressed in its circumference and urged against the other member for dynamic sealing against this member and the other element is pre-stressedly arranged against the sealing ring for obtaining sealing between the sealing ring and the sealing groove. The sealing ring includes a substantially deformation stable, elastic and at least to a main part hard material providing a substantial, not deformed cross-section. Moreover, the sealing ring is thin having such a small radial middle height ($h_m$) according to the formula

$$h_m = \frac{A}{b},$$

where A is the cross-section area of the sealing ring and b its radial width, that the sealing ring has acceptable maximum pre-loading surface pressure p against the other member considering the material and surface structure of this member and the lubricating qualities of the medium according to the formula $$p = 2A \cdot \Delta d \cdot E / b \cdot d^2.$$

where E is the co-efficient of elasticity of the sealing ring, d its diameter and d its diametrical elastic deformation. Moreover, the radial height of the sealing ring along its side surfaces facing the gap between the member is at least as large as the maximum radial height of the gap.

9 Claims, 4 Drawing Sheets

SEALING DEVICE

This application is a continuation of Ser. No. 07/323,124, filed on Mar. 13, 1989 now abandoned, which is a continuation of application Ser. No. 046,061, filed Mar 25, 1987 now abandoned.

TECHNICAL FIELD

The present invention relates to a sealing device for providing a seal between two members which are movable relative to each other and have cylindrical contacting surfaces between which there is play. One of the members to be sealed is provided with a sealing groove in which is positioned a sealing ring. The sealing ring is circumferentially pre-stressed against the cylindrical surface of the other member for dynamic sealing against such surface. The sealing groove also includes a gap positioned on at least one side of the sealing ring and at least one element is arranged in the sealing groove and pre-stressed against the sealing ring.

BACKGROUND OF THE INVENTION

Sealing at high pressures in, for instance, hydraulic cylinders and similar components, is critical regarding function and reliability for most mobile working machines and heavy mechanized and automatized equipment. In spite of intensive efforts to develop more adequate dynamic seals, these wearing sealing members must still be exchanged one or more times during the life of the cylinder. Inadequate sealing function is also one of the most usual and the most serious cause for breakdowns in hydraulic systems. Current sealing techniques and the inadequacies of seals in meeting the desired function not only result in a short lifetime but also result in several other disadvantages which, in varying degrees, depending on application type, adversely impact upon the function of the product and also limit its use in hydraulic applications. In addition, there are other serious disadvantages such as the influence of high and low temperatures and friction and stic-slip limitations.

Because of the importance of proper sealing and also because of the difficulties incurred in achieving proper sealing, it is common in both relatively demanding, and also in relatively simple, applications to attain the best possible result by requiring close diameter tolerances and very smooth surface finishes on the sealing surface, both for cylindrical tubes and piston rods. The prior art seals, usually made of polymeric materials, involve a small part of the total cost of the component, but the demands imposed on cooperating surfaces to be sealed involve substantial cost as compared to the material costs. Thus, the total cost for sealing a component represents a significant cost item while the cost of the sealing ring itself generally is very low.

The problem of short lifetime for the seals arises from three main causes. Seal fatigue can occur due to pressure and pressure changes, resulting in cracks which result in leakage and breakdown. As a result of pressure forces, the seal can be forced into the gap between the two members to be sealed, with cracks, leakage and breakdown occurring as a consequence. Also, in order to reach low dynamic leakage, the sealing body is usually formed with sealing lips or surface projections which will pierce the liquid film. If this part of the seal becomes worn, the desired pressure peak is not obtained, resulting in increased dynamic leakage.

Prior art seals are accordingly designed to take into account fatigue, and to provide adequate wear resistance for the wearing surfaces of the seal. No significant improvements in seals have, however, been developed during the last 20 to 30 years. However, some new optimized configurations of the sealing ring and the introduction of new materials have improved the fatigue and wear characteristics. Nevertheless, the problem of short seal lifetime still exists, mainly due to the wear of the contacting surface of the seal members.

Even with use of the best wear-resistant materials now available, wear is nevertheless, in most cases, unacceptably great. The reason for this is that the principal function of conventional present-day sealing members is dependent upon providing a very high contact pressure at the lip, to provide the required sealing function. But the effectiveness of such a seal presupposes that the sealing lip is not worn or deformed. The required pressure exerted on the material of the seal and at its contact area, mainly the sealing lip, is the factor that determines wear as well as the setting of the material. It has not been possible as a result of the improvements in the prior art to succeed in developing marked improvements in conventional sealing techniques by various new sealing configuration and material qualities, but only to improve sealing to a varying degree. There is accordingly reasons to believe that current conventional sealing techniques already have been quite fully developed in relation to their potential and cannot be developed further in any really appreciable way.

The high pressure exerted at the sealing lip consists of the sum of the liquid pressure and also the pressure that arises in the sealing material when the cross-section of the sealing member is compressed in the sealing groove. Pre-compression of the sealing member is necessary in order to seal dynamically at low pressures and zero pressures. Since the sealing member, with the passage of time, loses its pre-stress, and thereby also of course in the sealing lip, sealing problems often arise at low pressures after a time. These problems usually become acute during wintertime when the viscosity is high and the sealing material at low temperatures has decreased elasticity.

In order to decrease the problems associated with setting, seals made of polymeric materials must accordingly be configured with comparatively large radial height. This results in unwanted large dimensions, and increases the difficulty and expense in incorporating such seals into the product.

In summary, the sealing function of conventional polymeric sealing members at low pressure must be achieved by precompression of a relatively high sealing section. The surface pressure demanded in the sealing lip is usually about 2–5 MPa. The pressure-caused setting and wear in the sealing lip is, for a conventional 25 MPa system, between about 10 and 30 MPa, essentially above the surface pressure required for sealing. It is, accordingly, a fundamental disadvantage in conventional seals that they are loaded far in excess what the seal requires.

A consequence of the high contact pressure between the sealing element and corresponding surface which results from the fluid is that starting friction is increased. Even worse is that this friction is remarkably reduced upon movement with the result that abrupt movement can easily occur. When pressure and viscosity and also a number of other factors are such as to increased the possibility of such an occurence hydraulic actuators often cannot be used where precise positioning is required.

One way to decrease abrasion on a sealing member is to design it so that, at low speed, it forms an oil film and accordingly functions as a slide bearing. For sealing pistons, where internal leakage has no detrimental effect, this method can be used, and it is used also today to a relatively high degree. With a piston rod, however, outer leakage cannot be accepted and measures must therefore be directed toward preventing film formation. If film formation arises, this takes place at increasing speed and viscosity. Since the velocity in a reciprocating movement in a cylinder must decrease to zero for turning, film formation only arises during a part of the stroke. At low velocity, the wear is great and therefore seals having good film formation in practice are not more wear-resistant than seals which cannot form a film.

Thus, the lifetime of conventional seals can be increased by choice of wear-resistant sealing materials and by providing a low profile depth for the cooperating opposite surface, together with a profile that has lower wear than other profile forms. The most usual sealing materials today are polyurethane and nitrile rubber having various wear-decreasing additives. Also PTFE, in combination with other materials, is a relatively common sealing material. Seals made of polymeric materials have, for a long time, most commonly been used as sealing materials in cylinders and similar components. One exception is that piston rings in metal are used relatively often, particularly in the United States. These piston rings are split with a sealingly overlapping slit. The advantages of this sealing type are good life, high temperature resistance, comparatively low friction, good stic-slip qualities, and small dimensions. A great disadvantage, however, is their very high leakage which limits the piston ring to use as a piston sealing, particularly in applications within industrial mechanization.

A piston ring formed of metal should constitute excellent sealing if the leakage is not 100-1000 times higher than that achieved with soft seals in polymeric materials. The fact that piston rings formed of metal nevertheless have been used with great success is explained by the fact that the piston leakage is of approximately the same magnitude as the leakage in the valve guiding the cylinder.

Important differences between the different materials are their stic-slip qualities and friction qualities and also their tendency to form temporary local molecular bonds to the molecules of the opposite surface. In this respect, the usual polyurethane and nitrile materials are the worst, PTFE-combination in different forms is better, and metal generally is best. With the conventional prior art seals of today, there is no seal that in all types of applications is the best, but both seal type and choice of material is selected to achieve the best possible solution.

SUMMARY OF THE INVENTION

The present invention eliminates the above-mentioned and other known disadvantages. Although a somewhat increased static initial leakage results, nevertheless, the seals of the present invention have the following advantages:

a) Low total cost for sealing and cooperating opposite contacting surface.

b) Long lifetime even if the opposite surface has a relatively high profile depth and a comparatively high wearing surface profile.

c) Low friction.

d) Low tendency for stic-slip.

e) Insensitivity to high and low temperatures.

f) Insensitive material in the seal which is not chemically influenced by pressure medium.

g) Low tendency for temporary local molecular bonds between sealing and opposite surface.

h) Seal not influenced while stored, either mounted and unmounted.

i) Small dimensions.

A sealing device according to the present invention provides all the above-mentioned qualities at the same time.

Conventional seals have high contact pressure between the sealing element and a cooperating opposite surface, directly increasing with the liquid pressure involved. They have also a "sealing lip" or the like, which is essential to provide a sealing function but which, upon wear and setting of the material, deteriorates, thereby resulting in increasing leakage. The present invention meets, as a first essential prerequisite for good lifetime, the condition that the contact pressure between sealing and cooperating opposite surface is low and is only to a comparatively limited extent influenced by the liquid pressure. As a second essential requirement for long-lasting performance and good sealing, the sealing device according to the invention meets the condition that its sealing shape, which is important for sealing, does not deteriorate as a result of setting or wear.

The sealing techniques of the prior art have not succeeded in solving the problem of providing a pre-stressing, which is dependable, and which does not change with time, wear and different environmental factors. Mostly elastic materials such as rubber, polyurethane, etc., have been the material of choice. As to metal, which generally is considered to have completely insufficient elastic qualities, the only exceptions are piston rings which, through bending and bending stresses, have a relatively large capability to change their diameters. The pre-stress of conventional seals in elastomerics such as rubber, polyurethane, etc., is mainly obtained by a compression of the cross-section of the seal, and to a slight extent by deformation in circumferential direction. Soft conventional seals receive a substantially even surface pressure around the circumference, which, however, decreases with time due to setting of the material and the influence of various environmental factors.

In order to decrease with conventional seals, the radial height of the sealing element must be increased, and materials or material combinations having good setting qualities must be used. The pre-stress in a conventional piston ring requires, in order that it be acceptably high, that the radial height of the piston ring is so high that it is no longer slender. Consequently, the piston ring becomes so thick that it becomes insufficiently bendable and torsionally much too rigid to be able to follow defects, i.e. non-circularity, waviness, etc. of the cooperating opposite surface.

Thus, a conventional piston ring formed of metal has a very uneven circumferential contact pressure and includes portions not experiencing surface contact, resulting in comparatively high leakage. It is extremely surprising that it is possible with a sealing device according to the invention having a sealing ring with a setting-free, elastic and hard material, for example metal, to obtain the above-mentioned advantages and to achieve the desired elasticity and to provide an even, sufficiently high contact pressure but which is still sufficiently immune to time, wear, and various environmental factors.

The present invention is based on the observation that the tolerance zone for the diameter of the corresponding opposite surface is lower than the diameter change obtained if the material of the sealing ring is subjected to circumferential compressive or tensile stress up to its yield point. It is also surprising that it is possible, with very small contact pressure, to establish a very high tensile or compressive stress in the circumferential direction.

In a sealing device according to the invention, both the low contact pressure and the bending and torsional ability in the circumferential direction of the cross-section of the sealing ring required for high sealing is obtained simultaneously by the fact that the ring has a very low radial average height ($h_m$). The desirable combination among the factors of contact pressure (p) of the sealing ring, its diameter (d), its cross-sectional area (A), its average height ($h_m$), its width (b), its diameter change ($\Delta d$); and its coefficient of elasticity (E) is, with satisfactory accuracy, satisfied by the following formula:

$$p = 2A \cdot \Delta d \cdot E/b \cdot d^2$$

where $$h_m = \frac{A}{b}$$

In a specific application, the diameter (d) and also the pre-stress, for example, the diameter change ($\Delta d$), are then defined. The pre-stress ($\Delta d$) must, of course, be greater than the tolerance area of the diameter (d). By choosing a material having adequately low coefficient of elasticity and by making the average height ($h_m$) sufficiently low, the contact pressure becomes sufficiently low. As is evident from the formula, the average height ($h_m$) can increase when the diameter (d) increases. At least at its end surfaces, the sealing member must have a height exceeding the diametrical height between the members it seals. Between these end surfaces, the thickness can, however, advantageously be decreased. Bearing in mind the commonly existing necessary play, the sealing member can normally be given an average height not exceeding about 3 mm and preferably less than about 1 mm.

The average height ($h_m$) can increase with the diameter (d) up to relatively high values of large diameters (d) without having the surface pressure (p) become too high. For the sealing ring to be able to follow the opposite surface and provide complete sealing, the average height ($h_m$), and to a certain degree also its width (b), should be limited.

The sealing means of the present invention is characterized by its use of a ring which is formed of a material having such properties that the ring will, upon being circumferentially pre-stressed against an opposing surface, be able to effect a fluid tight seal with such opposing surface; at the same time, however, the material employed is "setting-free," i.e. the material does not take a "set" or permanent deformation as a result of the pre-stressing to which it is subjected, and as a result the ring is able to maintain a constant pressure against the opposing surface with which it forms a seal over long periods of time. The sealing means of the present invention is therefore clearly distinguished over the prior art soft or semi-hard seals which create their pre-stress primarily by compression of their cross-section when circumferentially pre-stressed and which are also characterized by their tendency to take a set in their cross-section when subjected to stress over a period of time. By way of example only, in the typical embodiment of the invention, the sealing ring may be formed of a hard material such as steel. For normal sealing diameters, the average height of the ring, i.e. its thickness, measured radially, may be about 1 mm. It is to be understood, however, that the above example is not intended to limit the invention to the use of steel, or even to the use of metal for a ring, nor to the cross-sectional height or thickness referred to above. Compared with conventional piston rings formed of metal, there is also a fundamental difference in the fact that such rings only have bending stresses in cross-section which, setting-free, provide the contact pressure. The total contact pressure between the sealing ring and the opposite surface is for a conventional soft sealing, approximately the pre-stressing pressure plus the pressure drop of the medium over the sealing. For a conventional piston ring formed of metal, the contact pressure is approximately the pre-stressing pressure plus half the pressure drop over the seal. If no other measures are taken, this is also valid for the present invention.

As distinguished from soft conventional seals and a piston ring formed of metal and split through overlapping slits, the sealing device according to the present invention can be formed such that the contact pressure, to a relatively high degree, is independent of the pressure in the medium due to its rigid, small, unbroken cross-section. Even if the sealing device according to the invention, like the conventional piston ring formed of metal, can operate with a contact pressure including half the pressure drop over the sealing, much is gained by decompressing the sealing ring and lowering the contact pressure. Wear and friction can then be decreased, and a less advantageous surface on the opposite surface can be accepted. As a result of the fact that the sealing in the preferred embodiment of the invention is made substantially of metal, a third condition is met for essential long lifetime, good sealing, and environmental insensitivity to high and low temperatures or chemical medium, and no tendency to form a temporary molecular bond with the opposite surface.

Because of the low contact pressure permitted by the seal of the present invention, and because of the decreased effort of the fluid pressure on the contact pressure between sealing ring and opposite surface, and also because of the use of the preferred stiff sealing material, the seal is less affected by, for example, environmental factors, and a low friction seal is obtained which has less tendency for stic-slip movement. The sealing ring is mounted "gap-free." It lacks gaps, either by the fact that upon compressive stresses the split is compressed, as for instance in piston sealing, or upon tensile stresses as for instance in a piston rod sealing, because there is no split.

When sealing members of soft and hard sealing materials, are pressed against an opposite surface, there are great differences both in sealing ability and in wear. Often a soft conventional sealing member, during approximately its first 1000 strokes wears down the opposite surface, measured in the direction of movement, to about half the profile depth. The surface wear slowly decreases thereafter. Measured cross-wise of the direction of movement, the surface unevenness increases in many cases.

The soft sealing member has a tendency to wear on the surface both on the tops and in the valleys. This means, among other things, that possible soft materials positioned in the valleys can be worn off by the soft sealing member. The hard sealing member only wears on the top of its profile and this continually improves the surface measured in all directions. The hard sealing leaves material in the valleys completely untouched because of the fact that it never reaches down below the tops of the opposite surface profile. Comparative lifetime tests between conventional soft and semi-hard seals and the preferred embodiment of a sealing device according to the invention show that the metal sealing of the invention has almost negligible wear, while the soft and semi-hard seals are worn considerably more. Moreover, the hard sealing member maintains its cylindrical surface form, while the soft and semi-hard seals are worn considerably at the "sealing lips," or like areas critical for sealing, where the surface pressure is highest.

The wear of metal seals in tempered steel has, after the completion of long-term tests, been shown to be only a fraction of a micrometer. This can be readily confirmed since the wear is limited to partly wearing down the tops in the originally manufactured surface profile of the sealing. The hard metal sealing receives its local highest loads in the points where the sealing surface and the opposite surface accidentally meet each other, usually crest against crest.

A sealing device according to the invention with its extremely low sealing wear is substantially insensitive to the profile depth and surface characteristic of the opposite surface as distinguished from soft and semi-hard conventional seals. Conventionally honed, ground or roll-polished surfaces can be used as well as rough drawn surfaces. The manufacturing costs for the cylinder tube can thereby be lowered. Conventional soft and semi-hard sealing provide tightness by the fact that they can better follow form defects of the opposite surface and thereby prevent the formation of micro-channels between the contact surface of the sealing elements and the opposite surface.

The hard sealing is in this respect slightly limited and both a static initial leakage in certain cases, and a dynamic leakage higher than for soft conventional seals, can arise. This is no essential disadvantage for a piston sealing which experiences only internal leakage since the sealing leakage is considerably less than the leakage of the cylinder valve and considerably less than the equivalent effect produced, for example, by the cooling of the hydraulic oil in a non-operative hydraulic cylinder. Since the micro leakage in channels having a height of about 1 to 5 micrometers rapidly ceases after clogging, for example, as a consequence of the interaction between the molecules of the oil in the cylinder, the sealing becomes, after a period of non-operation, generally completely tight statically.

When sealing a piston rod, where the leakage is external and detrimental, a hard sealing cannot alone provide perfect sealing. The conventional soft sealing is rapidly worn down, particularly when the pressure is high and the velocity and the viscosity are low. At low pressures, the wear is considerably lower. By combining the sealing device according to the present invention, which is wear-resistant and smooth-running even at high pressures, with conventional soft sealing positioned downwardly in the leakage direction, so that the soft sealing member only has to assure tightness at low pressures, piston rod sealing having low leakage, low fiction and long life can be obtained.

In order to further increase the sealing function of the present invention sealing device, two further different measures can be taken. Since the main part of the leakage derives from micro-channels in the substantially rough opposite surface, such surface can be coated with a layer of a material softer than metal, for instance, some type of tempered lacquer, etc. This can preferably take place by a surface coating method as described in U.S. Pat. No. 4,532,151 and Swedish SE-A-8203782-1. According to this method, the surface is first subjected to vacuum, whereupon the "lacquer" is directly supplied under high pressure and is spread to an even layer of desired thickness. With this method, it is then also possible to fill and tighten the porous chromium layer usually existing on piston rod surfaces to coat rough-drawn surfaces, and also to eliminate the detrimental effect that possibly existing small draw scratches have. The vacuum gives good adhesion and the possibility for penetration and also good filing of the surface layer, while the pressure is required for good penetration and filling of the surface layer.

A metallic surface which is coated with a softer material, and which is positioned substantially in the valleys of the hard surface, impurities, scratches, etc., is influenced by a sealing device according to the invention in a different way than by conventional soft seals. The leakage of the hard sealing decreases and the film formation is facilitated since the surface with respect to the flow between sealing and opposite surface has become smoother and tighter. The main contact pressure between sealing element and opposite surface is also now absorbed by the metal tops of the respective surfaces, but this pressure has now decreased.

A soft conventional sealing wears, particularly at high liquid pressure, on both the tops of the metal surface and the softer material but, at the longest, remains in the valleys of the surface. Depending on the wear qualities of the supplied surface layer, type of soft sealing, etc., the surface is worn more or less so that the underlying surface profile of th surface appears. At low pressures and with a good coating material, the wear of the conventional soft sealing on the surface coating can become small. This is of value and can be utilized to seal of a piston rod with, first, a sealing device according to the invention, which takes up the high pressure, and thereafter employ a conventional soft sealing, such as a U-ring sealing in polyurethane, which maintains high sealing at low pressure. The other possibility of improving the sealing ability of the present sealing device formed of hard material is to coat the contact surface of the sealing element acting against the opposite surface with a thin layer of a soft wear-resistant material.

It is also possible to build up the sealing with two parts, where the contact surface is positioned in a thicker ring of a semi-hard but relatively form-stable and wear-resistant material, such as reinforced polymeric material, and the pre-stress is substantially obtained by a thinner ring of a more form-stable and setting-free material such as metal. The soft or semi-hard material at the contact surface, which is provided with a thickness of four tenths of a millimeter up to about 1 mm, increases the sealing effect but becomes more sensitive to contact with poor surfaces and receives higher wear than would, for instance, a tempered steel surface. Upon wear on the contact surface of the sealing ring, however, it substantially maintains its original cylindrical form and wear, and setting does not become a sealing problem initially, but only later when high wear has decreased the pre-stress and caused too low a contact pressure. As for other sealing types, a coating of the opposite surface with a soft wear resistant material is an advantage, increasing tightness and life of the sealing.

The invention is in the following described more in detail with reference to the accompanying drawings, wherein:

DETAILED DESCRIPTION OF THE PREFERRED EMBODIMENT

A sealing device according to the present invention comprises a sealing ring 1 positioned in a sealing groove 2 formed in one member 3 of two members 3 and 4, between which sealing must be provided for dynamically sealing against an opposite surface 5 of the other member 4. It is important, however, that the sealing also seals statically against the member in which the sealing groove 2 is formed, while at the same time allowing members 3 and 4 to be movable relative to each other due to play, deformation, etc.. Since the sealing ring 1, is pre-stressedly pressed against opposite surface 5, the sealing follows or contours this surface. The sealing must accordingly be sealed with radial movement freedom against at least that side of the sealing groove 2 where the higher pressure ahead of the sealing drops to the lower pressure after the sealing.

There are several means for providing side sealing. Each of several preferred embodiments having suitability in different applications will in the following be described.

Figure 8:
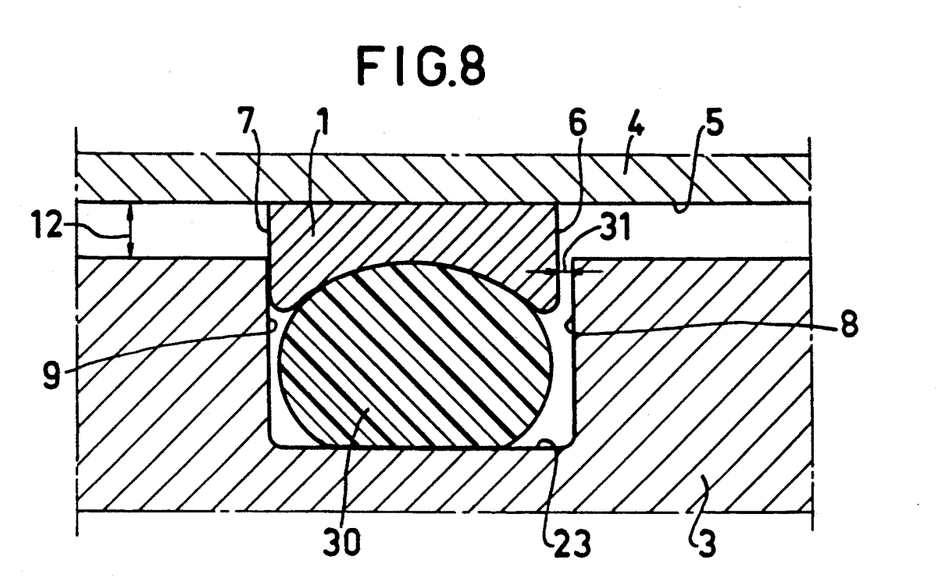
FIG. 8 is a section through a further embodiment of the present invention.
Figure 9:
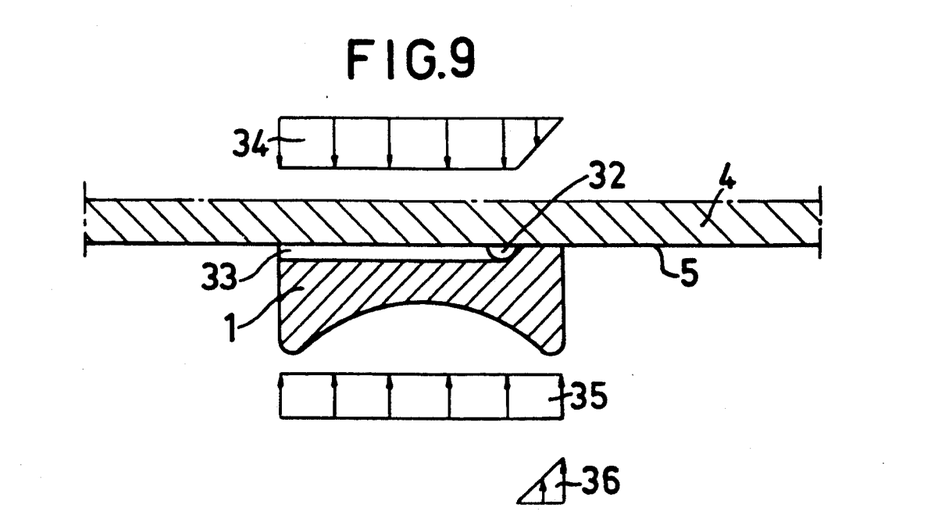
FIG. 9 illustrates a decompressed or pressure balanced version of the embodiment according to FIG. 8.

The first solution is described with reference to FIGS. 1–7. This solution involves higher cost for the sealing element but can be pressure-unloaded more unlimitedly and also provides a pressure limiting function. The second solution is described with reference to FIGS. 8–9 and substantially with regard to its differences with respect to the first solution. The second solution yields a lower cost for the sealing element than the first but has functional limitations, particularly concerning the possibility to pressure-unload in a double-acting sealing. This third solution is described with reference to FIGS. 10 and 11 and particularly the differences with regard to the first and second solutions. The third solution results in a lower cost for the sealing element than the first solution (FIGS. 1–7) and about the same cost as the second solution (FIGS. 8–9). It also provides sealing with reduced dimensions which can be pressure-unloaded.

Figures 1, 1A:
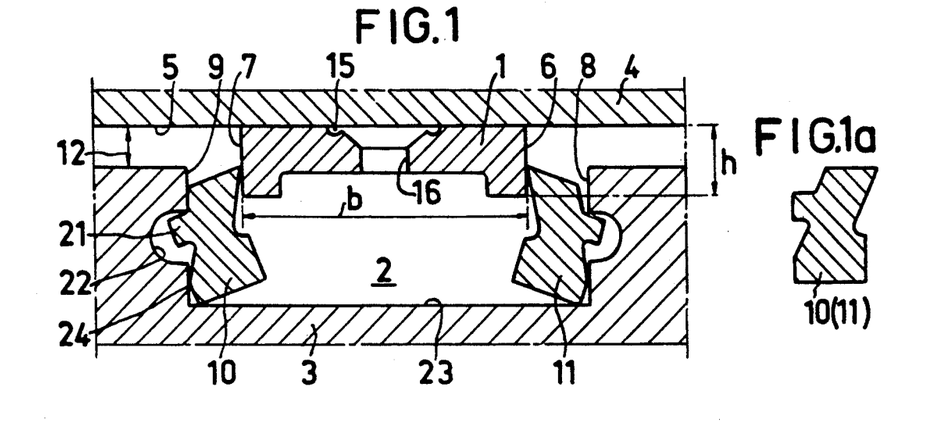
FIG. 1 is a section through a sealing device according to a first embodiment of the present invention.
FIG. 1a is a cross-section through a sealing element forming a part of the sealing device according to the present invention and shown in an unloaded state.

In the embodiment shown in FIG. 1, the seal is realized by a simultaneous sealing of the area between the side surfaces 6, 7 of the sealing ring 1 and opposite side surfaces 8 and 9 of the sealing groove 2 by means of resilient washers 10 and 11. Thus, the washers 10, 11 abut and seal statically against both the sealing ring 1 and against member 3. The sealing ring 1 alone abuts and seals dynamically against the other member 4. A gap 12 between the members 3 and 4 allows for movement of members 3 and 4 relative to each other. The movement between the members 3 and 4 is bridged and sealed at the abutment surfaces between the spring washers 10, 11 and the sealing ring 1, for example, at the side surfaces 6, 7 of the sealing ring 1. The sealing must therefore, at the contact area, have a minimum height larger than the degree of movement between the members 3 and 4. In order to create the lowest possible surface pressure between sealing ring and opposite surface, the sealing ring 1 should be as thin as possible, and it is preferably made thinner inside the abutment surfaces 6,7 against the spring washers 10, 11.

When there is no pressure drop across the sealing ring 1, the sealing and the spring washers 10, 11 are in an intermediate position. When a predetermined pressure drop occurs across one of the spring washers 10 as shown in FIG. 1, it is pressed against the side surface of groove 2. There are several functional requirements for static sealing between the spring washers 10, 11 and the sealing ring 1. The decisive dimensional requirements for the spring washers 10, 11 are that the spring force in the washer 11, at its maximum spring-back, shall be able to hold the sealing ring 1 against the spring washer 10 when the member 4 moves relative to the member 3 in a direction opposite to the pressure drop direction. This is of course valid for both high and low pressures.

The spring force in the washer 11 must be sufficiently high to prevent the sealing ring 1 from being drawn by the frictional force between the sealing ring 1 and the side surface 5 of the member away from sealing contact between sealing surface 7 and the washer 10. The frictional force can be kept relatively low since the contact surface is small, the friction coefficient is low, and the contact pressure is low due to, among other things, the pressure balance.

Figure 2:
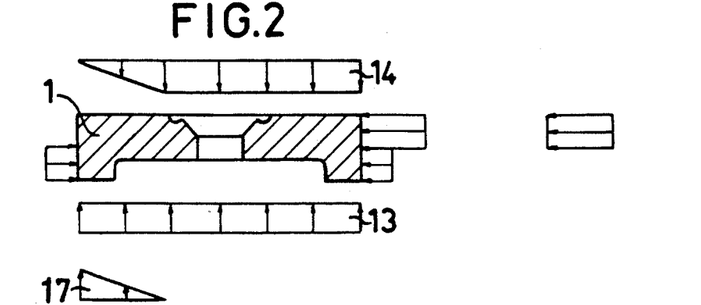
FIG. 2 is a cross-section through a sealing ring forming a part of the sealing device according to the present invention and illustrates fluid pressures acting on the sealing ring in a loaded condition.

How the fluid pressure balance is obtained appears from FIG. 2. The sealing ring 1 acting in a radial direction presses against the member 4 as shown by the pressure distribution 13 and in the opposite direction as appears from the pressure distribution 14 obtained by pressure compensation groove 15 and hole 16 formed in the sealing ring 1. Thus, the resulting pressure distribution 17 pressing the sealing against the member 4 acts only on a relatively short part of the sealing surface and then furthest out, where the pressure drops from the higher to the lower pressure value. The mechanical contact pressure between the surfaces, which takes up and balances the resulting fluid pressure difference, is distributed over the width of the sealing since the cross section of the sealing is form-stiff and experiences substantially no deformation. The distribution is affected by several factors but is always such that the surface pressure is highest at the unbalanced outermost sealing surface. FIG. 2 also illustrates axial stresses.

Tests have shown that the ring is worn relatively evenly over its width at the same time that its sealing capability increases. A substantial part of the contact force of the sealing ring for a pressure-balanced sealing ring derives from the pre-stress of the sealing ring 1.

Figure 3:
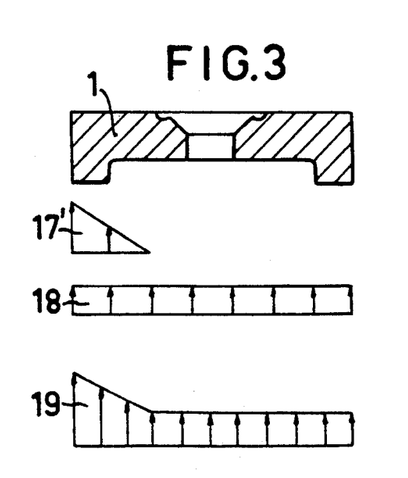
FIGS. 3 and 4 illustrate the fluid and "preload" pressure distribution on the sealing ring.
Figure 4:
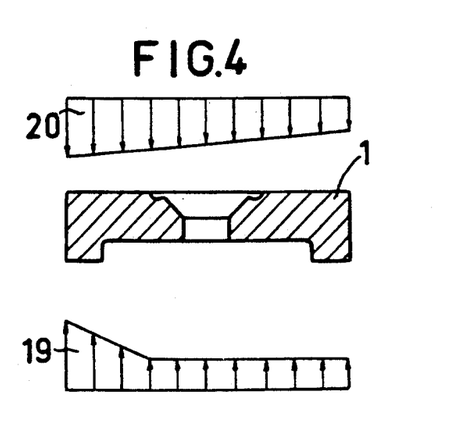

FIG. 3 shows how the radially directed resulting pressure distribution 17 in the pressure medium, and the likewise radially directed pressure distribution, equal the forces that press the sealing ring 1 towards member 4 when the circumference of sealing ring 1 is elastically deformed by prestressing and the two add up to a total resulting pressure distribution 19. FIG. 4 shows how the resulting pressure distribution 19 is balanced by the mechanical contact pressure distribution 20 between the sealing ring 1 and the opposite surface 5 of the member 4. Since the sealing abuts against the opposite surface 5 without any significant torsion, the two pressure distributions 19 and 20 are in balance both with regard to force and moment on the sealing ring. Since the unbalanced surface part of the total width often is about 20%, the average pressure in the contact surface becomes affected by, and increased, with only about 10% of the pressure in the medium. This is true as long as the opposite surface 5 does not spring away and decreases or increase the contact pressure due to a decrease or an increase of the pre-stress of the sealing ring 1.

A piston rod sealing, where the piston rod often is massive or coarsely tubular, runs against a surface with a little resilience, while a piston sealing, which runs against a cylindrical tube, must follow the diameter of the tube, increasing with the pressure. For a piston sealing, one therefore preferably chooses, for safety reasons, to position the pre-stressed and unbalanced surface of the sealing ring 1 in such a way that for a tube with maximum diameter within its manufacturing tolerance area, it can conform to the tube when it is affected by maximum pressure on the high pressure side and by about 63% of this pressure on the low pressure side. At the sealing area, the tube springs outwardly in proportion to the average value of the pressure ahead and behind the sealing.

If a long tube at a certain pressure has a resilience of some magnitude, the elastic deflection outwardly becomes, at the sealing area, normally only half this elastic deflection since the pressure at the low pressure side of the sealing normally is zero. The increase of the contact pressure caused on the unbalanced seal surface is proportional to the difference between the pressure existing at the high pressure side and the low pressure side of the sealing. Since the thickness of the sealing can be about 10% of the tube thickness, only small unbalanced surfaces and low pressure difference are required to compensate for the decreasing pre-stress in the sealing ring 1 when the opposite member deflects away due to the pressure in the medium.

A cylindrical tube is generally dimensioned so that, at maximum pressure in the medium, the tensile stress in the tube is about 40–70% of the yield stress value for the tube material. When the average thickness of the sealing is about 10% of the tube thickness, only a surface contact pressure of 10% of the maximum pressure of the medium is needed for compressing a sealing ring of the same material by a diameter difference corresponding to the maximum diametrical resilience of the tube from zero to maximum pressure. The stress difference arising in the sealing then normally becomes only half the 40–70% of the yield stress value of the tube material obtained as stress in the tube. The stress variation in the piston sealing accordingly are only about 20–35% of the yield stress value for the tube material.

Since the stress in a piston sealing is a compressive stress which normally never causes fatigue damages, the effect of the pre-stress of the piston sealing is harmless from a fatigue point of view. The piston sealing can also be split, having a slit which becomes compressed and gap free For a piston rod sealing, it is valid that it is in one piece, unsplit, and subjected to tensile stresses which can cause fatigue damages.

In most cases, the piston rod is solid or coarsely tubular and negligibly resilient, and therefore the stress changes become negligibly small. In the few cases, with a thin-walled piston rod having internal positive pressure, the changes in tensile stress become generally limited to a maximum of about 20–35% of the yield stress value of the tube material. This can be accepted, since the tube material, which often has poorer fatigue qualities, must withstand twice as high stress variations, i.e., if the tube holds the sealing holds.

If, in order to decrease pre-stress and contact pressure, a material with a coefficiency of elasticity less than that of steel is chosen, for example aluminum, the fatigue qualities of the material decrease but also its stresses and therefore this also does not create a problem. The large part of the maximum deformation of the sealing ring 1 and thereby the large part of the maximum contact pressure deriving from the pre-stress is due to necessary pre-stress for providing sealing both at the smallest and at the largest diameter within the manufacturing tolerance area. A cylindrical tube has normally today the largest tolerance, with usually maximum 10th to 11th grade, while a piston rod usually has maximum 8th to 9th grade, thereby resulting in 2 tolerance grades less than for the tube tolerance area. At the yield stress value for the tube material, the cylindrical tube has often a maximum resilience which is about twice the tolerance area for 10th ISO-grade. Thus, the maximum pre-stress for a piston sealing provides pressure stresses in the sealing ring which are higher than about half the yield stress value of the tube material. It is therefore appropriate and possible to use about 10th ISO-tolerance grade for the cylindrical tube and about 8th to 9th for piston rods.

Thus, proceeding from cylindrical tubes and piston rods having current normal existing diameter tolerances, a cylinder sealing according to the present invention can be dimensioned to have allowable stresses and at the same time comparatively very low values for contact pressure and sealing friction. Advantageously, the width of the sealing ring 1 can be made as narrow as about 3 mm. Since it is desirable to limit the radial height of the sealing, the spring washers 10, 11 should have a low radial height. Practical dimensioning, which is very complicated with several important factors involved, has shown that the depth of the sealing groove 2 with advantage can be limited to 4-5 mm.

Since the spring washers 10, 11 at the contact area against the sealing ring may have a width of only about 1 mm, the width of the sealing groove 2 is only about 5 mm. The compromise low sealing height, low sealing width, low contact pressure, low sealing friction and low height and width for the spring washers is an essential requirement for the exceptionally small sealing dimensions of the present invention. The improved tolerance for roughness of opposite surface 5 and the low contact pressure in combination with the small sealing dimension is further an essential requirement for achieving low total cost for both the sealing element and the opposite surface.

The spring washers 10, 11 which are quite small in dimension offer a number of advantages as well as a number of difficulties which in a sealing device according to the present invention, are readily solved to provide good, safe operation. It is essential that the spring washers have a limited radial position from the opposite surface 5 and do not diminish the play 12 which must exist between the sealed members 3, 4. It is also important to limit the position of the spring washers radially inwardly in the sealing groove 2 so that the contact surface of the sealing element against the spring washers can be as small as possible. This lowers the height of the sealing ring 1 and thereby the contact pressure and the sealing friction.

In response to the pressure drop across the sealing, one of the spring washers 10 shown in FIG. 1 is pressed hard against the groove side surface in member 3. The spring washer then cannot be moved radially without the presence of great forces, if for instance the spring washer should come into contact with the surface 5 on the member 4. Such a contact would probably lead to damage of the member 4 and the spring washer.

As shown in FIG. 1, the spring washers 10, 11, are, by means of a stop lug 21 formed on each spring washer and grooves 22 formed in the side walls of the sealing groove 2, prevented from being positioned outside the outer diameter of the member 3. Thus, the gap 12 between the member 3 and 4 can be utilized without the surface on member 4 coming into contact with the spring washers 10, 11. Moreover, the spring washers are prevented from moving radially inwardly, as shown in FIG. 1 by the bottom 23 of the sealing groove 2.

Since the spring washers 10, 11 have a low height in radial direction, they cannot resist the internal positive pressure acting in radial direction between high pressure side and low pressure side. In the embodiment of the sealing device according to the present invention, this problem is solved by three simultaneously acting measures. As a first measure, the ability of the spring washers 10, 11 to withstand an internal positive pressure is increased by making their thickness as large as possible in relation to the thickness of the diameter where the spring washers seal against the sealing ring 1. As a second measure, the spring washers 10, 11 have a stop lug 21 in engagement with the groove 22, whereby the diameter change and the radially directed movement of the spring washers are limited. As a third measure, the friction force acts, as shown in FIG. 1, between the spring washer 10 and the side surface 9 of the sealing groove 2. By positioning the pivotal point 24 of the spring washers 10, 11 against the side walls 8, 9 of the sealing groove close to the bottom 23 of the sealing groove, the spring washers have an essentially larger pressure surface in axial direction than in radial direction. The tendency of the spring washers to change their diameter is then counter-acted substantially by friction forces.

These three measures mean that the spring washers 10 and 11, in spite of their small dimension and their small strength and stiffness with low stresses caused by the pressure, are suitably guided within a narrow positional area. Since only one of the spring washers 10, 11 at the same time can be pressed against the side wall 8 and 9 of the sealing groove, at least one spring washer is always free to act as a pressure limiting valve in both directions. Thus, a dangerous positive pressure between the spring washers cannot arise.

Figures 5, 6, 7:
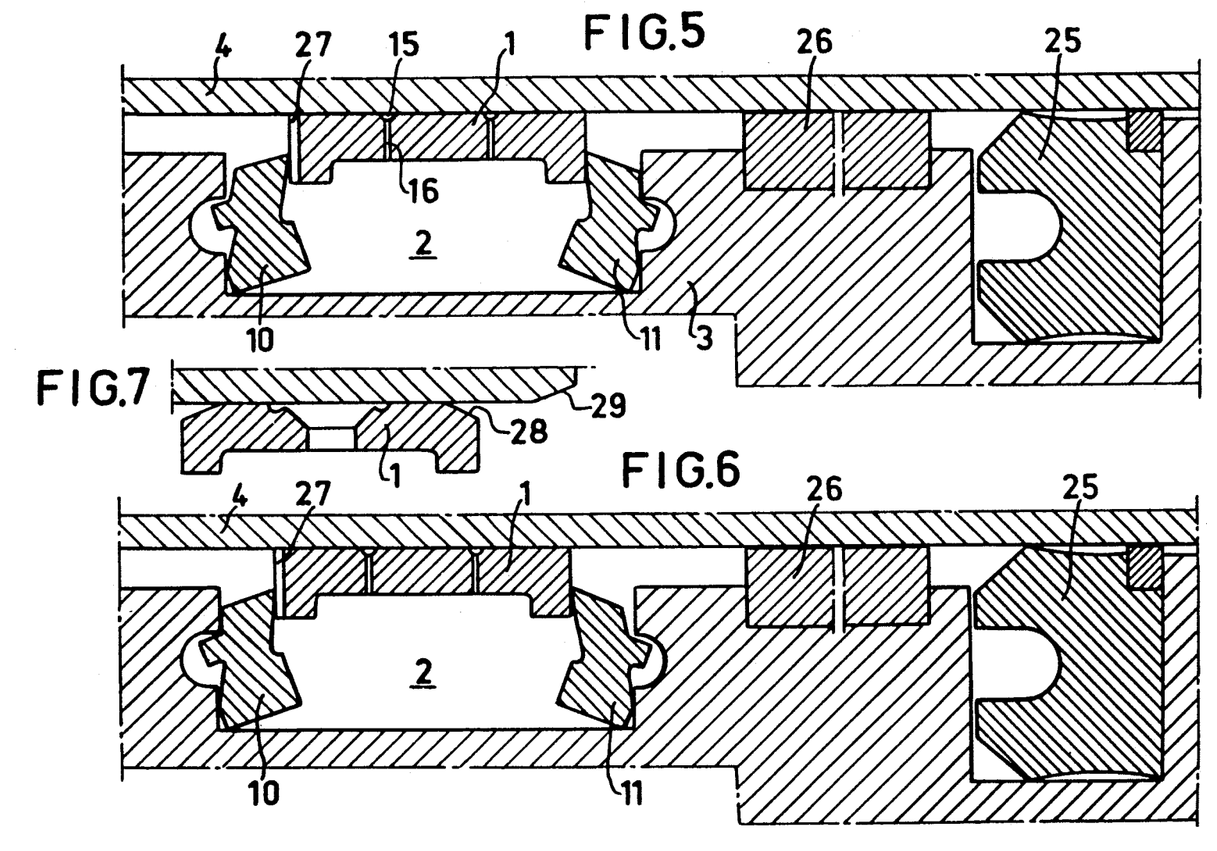
FIG. 5 is a section corresponding to FIG. 1 and showing another embodiment of a sealing and a further sealing forming a part of the sealing device according to the invention.
FIG. 6 illustrates in a section corresponding to FIG. 5 with the sealing in another position.
FIG. 7 illustrates a further embodiment of a sealing ring forming a part of the sealing according to the invention.

In connection with the sealing of a piston rod, a sealing device according to the present invention can be combined with a soft or semi-hard sealing. The low and even pressure required for the conventional sealing is well controlled by the spring washer 11 facing the soft sealing. Such a sealing device according to the invention including a soft or semi-hard sealing is shown in FIGS. 5 and 6. A piston rod sealing is shown in which the piston rod, corresponding to member 4 in FIG. 1, in addition to a sealing element shown in FIG. 1, is also sealed by a U-shaped sealing 25. Between these seals, a piston rod guide 26 has been provided, wherein a relatively large liquid volume is located between the seals. Through compression of the medium and the soft sealing 25, the space between the seals can operate as a pressure accumulator.

FIG. 5 shows how the sealing ring 1 and the spring washers 10, 11 are adjusted when the pressure drop is distributed over the sealing. The period, during which movement and pressure exist at the same time, becomes relatively short due to limitation in stroke length and piston rod velocity. If leakage over the high pressure sealing is low but higher than for the soft sealing 25, the pressure between the seals slowly increases with the stroke and time to a relatively low pressure. If thereafter the pressure on the high pressure side is relieved due to the fact that the pressure alternatively is applied over the two sides of the piston, the sealing on the high pressure side returns resiliently back in a way indicated in FIG. 6. In most cases the sealing ring 1 and the spring washers 10, 11 take an intermediate position.

Within the movement area of the sealing ring 1 the ring stops depend among other things on the magnitude and direction of the sealing friction Depending on position, the force in the spring washer 11 varies somewhat, but substantially the pressure between the two seals is relatively closely controlled. This pressure is about 2-5 MPa which is comparable with the pressure level for which conventional piston rod seals have the best tightness and lifetime. Also, regarding friction and tendency for stic-slip, the pressure is here within an advantageous range.

To prevent damaging pressures from building up between the two piston rod seals 1, 10, 11, and 25, the sealing between the sealing ring 1 and the spring washer 10 (see FIGS. 5 and 6) should be eliminated. As shown in FIGS. 5 and 6, this can be obtained by providing a groove 27 in the side surface of the sealing ring 1. Even if most qualities of the conventional piston rod seals, with the exception of the high tightness, are not as high as those for a sealing device according to the invention, it has, however, with the above-described sealing combination, become possible for a conventional sealing to operate within the pressure area where it has its best combination of qualities and its highest resistance to severe operations and environments.

Because of the spring washers 10, 11 the thin, bendable, and relatively easily movable sealing ring 1 requires, in order to be safe in operation and insensitive to impurities and defects on the opposite surface (for instance 5 in FIG. 1), a further important property. This property is the ability to avoid mutual damaging action between abutting surfaces and instead allows the sealing ring 1 to slide over a particle or a defect rather than try to remove the particle or level the surface, which probably leads to accelerated damage. In a sealing device, according to the invention, this property is achieved by the fact that the sealing is thin and along a short length relatively bendable and turnable, since the surface of the sealing ring 1 is hard, and preferably harder than the opposite surface, and because the sealing ring at its end has, as shown in FIG. 7, substantially short chamfer 28 having a small inclination. When it is desired that the sealing shall be lifted over defect or an impurity of some kind having low surface pressure and with forces which, as far as possible, only are directed radially, partly pressing the sealing ring 1 in a direction out from opposite surface 5 and partly the impurity or the damage portion in a direction towards the opposite surface, the angle should be lower than the friction angle, preferably about or below 15°.

It can also be necessary to have a chamfer 28 in the hard sealing in order to be able to pre-stress the sealing circumference and diameter upon its mounting in cylinder tubes or on piston rods. The mounting chamfer 29 which can be required on both the, cylinder tub and on the piston rod, should have a smaller inclination than the chamfer 28. At the same time, the outer diameter of the chamfer must be such that it can enter into the chamfer 29 before the pre-stress of the sealing ring 1 though the two chamfers 28, 29 is started. The local surface pressures become high at the time of mounting They do not cause cutting but often a certain compression of soft surfaces in the chamfer. As with conventional seals, lubrication means is used of course with advantage when mounting on both the sealing and the opposite surface.

The straight chamfer 28 shown in FIG. 7 can be replaced by a rounded chamfer. Tests have shown that it may be important that the inclination is close to or below 15°, but it is advantageous if the inclination continuously decreases towards the contact surface of the sealing ring. Considering the unbalanced contact pressure of the sealing and its affect on the medium pressure, the chamfer length is preferably limited to about 10% of the unbalanced width.

Without appropriate chamfers on sealing ring 1 and or the opposite surface 5, it can in many cases be almost impossible to mount the sealing member without damage. If the sealing is mountable with a very short chamfer 28, every chamfer of only a hundredth of mm can give good results. From a safety point of view and bearing in mind the mounting, the chamfer length can with advantage be about 0.05 mm. It should also be noted, that the sealing ring 1 in a sealing device according to the invention has the ability, both in operation and when being mounted, to pass over holes and grooves having limited diameter and width. Conventional soft and semi-hard seals do not have this advantage, and can normally not pass over holes.

The pressure-balancing grooves 15 formed in the contact surface of the sealing ring 1 and which, through one or several holes 16 shown in FIGS. 1 and 5, make the pressure in the grooves coincide with the pressure on the backside of the sealing ring, should also have a small inclination. The pressure balancing grooves 15 are preferably formed circularly with large width in relation to depth. This is also of importance in view of the bending stresses arising in the sealing ring 1, particularly at high pressures and when the contact area between the sealing ring and the spring washer 10, 11 is positioned at the inner diameter of the sealing ring for a piston sealing and its outer diameter for a piston rod sealing.

The hardness of the sealing ring in a sealing device according to the invention is of importance for extended lifetime and insensitivity to opposite surface conditions and insensitivity to impurities and damaged parts in the opposite surface. Life performance tests have shown that tempered steel has very good qualities. Other hard surfaces, for example of titanium nitride, aluminum oxide, hard chrome, etc., can also be used. Surface coatings of molybdenumdisulphid, Teflon, etc., which normally are considered to improve the ability of in-wearing, wear resistance, etc., do not improve wear resistance. Thin and relatively soft coatings having adherence are, however, of a certain value on both sealing ring 1 and spring washers 10, 11 and on the side surfaces of the sealing groove 2. This is valid if such coatings, after wearing-in, remain in the valleys, scratches, etc., of the surface and thereby tighten these, resulting in decreased leakage and faster clogging of the sealing.

In the embodiment of a sealing device according to the present invention as shown in FIGS. 8 and 9, sealing against the groove is provided by an O-ring or similar soft sealing body 30 which primarily tightens between the backside of the sealing ring 1 and the bottom 23 of the groove 2. The sealing ring in this embodiment, for the same direction of pressure drop and depending on the direction of friction and the relative movement between members 3 and 4, can be set in all positions between those limited by the abutment of the sealing ring 1 and its side surfaces 6 and 7 against one of the groove side surfaces 8 and 9. The difference in width between the groove 2 and the sealing member 1 must be sufficiently small that the maximum play 31 between them is so small that the sealing body 30, in spite of maximum pressure drop over the play 31, is not forced out through the play or damaged thereby disturbing the sealing function. In practice, the play should be about 0.1 mm or less.

Conventional so-called cap sleeve seals made of Teflon have a similar sealing configuration. There is, however, an essential and fundamental difference. Thus, in the conventional Teflon cap sealing, the object of the sealing element, corresponding to the sealing body 30, is not only to seal the sealing ring against the groove and to bridge movement between members 3 and 4 but also, as distinguished from this embodiment of the present invention, to provide the pre-stress of the sealing ring which usually is made of a relatively non-resilient material inclined for setting. This means that the sealing body of the conventional sealing must be made high and usually also correspondingly wide, and having larger dimensions than for a sealing according to the present invention, which, for normal sealing diameters, can be made about 4.5 mm high and 4.5 mm wide.

The sealing according to FIG. 8 is double-acting and has a contact pressure affected and increased by about half the pressure drop over the sealing.

FIG. 9 shows an embodiment of the sealing ring 1 which is most appropriate for single-acting seals. The sealing ring 1 is pressure balanced through the pressure balancing groove 32 running around the sealing and through at least one side groove 33 which is in communication with the higher pressure. The pressure distribution 35 urges the sealing ring against opposite surface 5, and the pressure distribution 34 urges the sealing ring from opposite surface 5. The resulting pressure distribution 36 presses the sealing ring against the opposite surface 5, as described above. The pressure-relieved version of this embodiment can besides being used as single-acting sealing, piston rod sealing etc., also be used as double-acting sealing in applications which have substantially only one pressure drop direction. Such applications are, for instance, in cranes and other machines usually lifting gravity loads.

Upon the occurrence of a small number of pressure changes in the direction for non-pressure-relief, the pressure becomes affected by the total pressure drop over the sealing. This is of course a disadvantage but can usually be accepted in cases when the sealing operates in a pressure-relieved stage over the main part of its operation time. This embodiment is characterized by exceptionally low costs for the sealing and also small dimensions. A disadvantage compared to the embodiment according to FIGS. 1–7 is, that it cannot function as a pressure limiting valve in double seals shown in FIGS. 5 and 6, and it only can be pressure-unloaded in one pressure drop direction since it is double-acting. Without being pressure-unloaded and with a width increase to about 4.5 mm, which the O-ring for the most usual diameters at least requires, the friction does not become lower than for good conventional soft or semi-hard seals.

Figure 10:
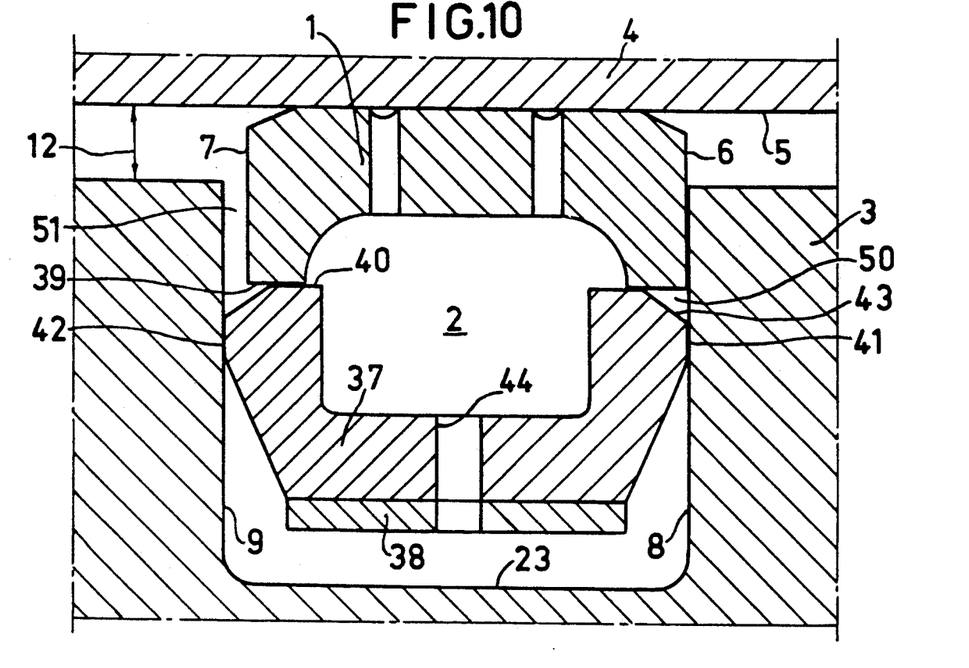
FIG. 10 is a section through a still further embodiment of the present invention.
Figure 11:
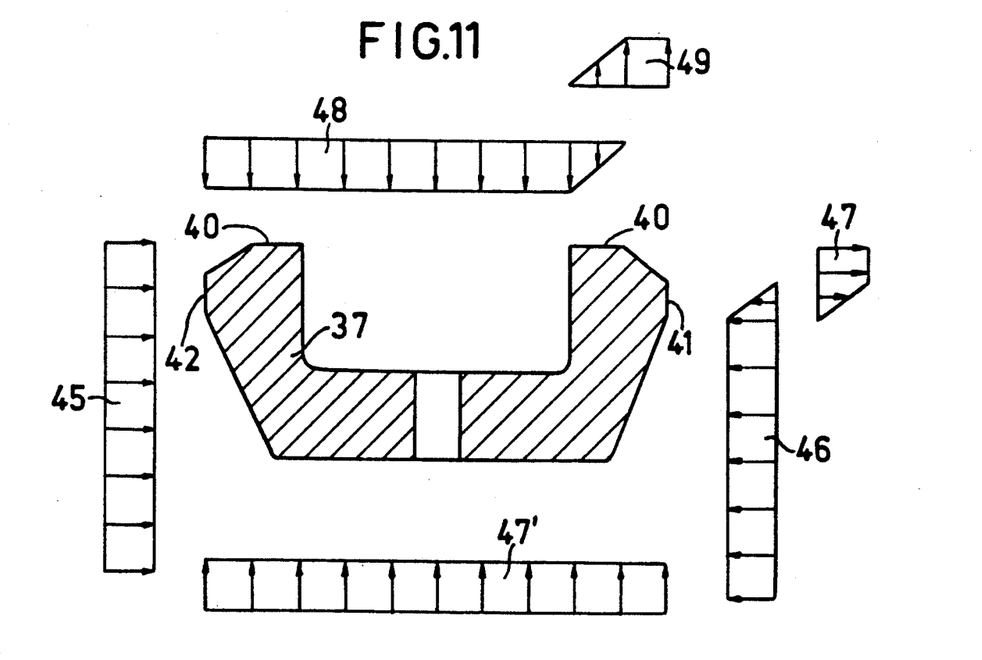
FIG. 11 illustrates the pressure distribution on the sealing ring in the embodiment shown in FIG. 10.

In the embodiment of a sealing device shown in FIGS. 10 and 11, the advantages of the embodiments according to FIGS. 1–7 and FIGS. 8–9 are united, and a pressure-balanced sealing with small groove dimensions is achieved which can be manufactured at low cost. The sealing against the groove 2 is established by a U-shaped ring 37 which can be made of a semi-hard relatively setting-free material, such as nylon, or a setting-free material, for instance steel or aluminum, or their combination. The sealing takes place between the interior surface 39 of the sealing ring 1 and the outer surface 40 of the U-shaped ring 37 and between the side surface 41 or 42 of the U-shaped ring and the side surface 8 or 9 of the groove 2.

The position of the sealing ring 1 is limited by the side surfaces 8 and 9 of the groove 2, and the maximum play 51 can, for a certain pressure drop direction, be allowed to exist at the groove surface 9, as shown in FIG. 10, and also at the groove surface 8. The sealing ring 1 can also take any position between the outer positions wherein the U-shaped ring 37, independently of the position of the sealing ring 1, seals at the side surface 8 or 9 where the pressure drops. The sealing is obtained by the fact that the side surfaces 41 and 42 of the U-shaped ring always are play-free, or with very little play, about the side surfaces 8 and 9 of the groove 2 at the same time that the U-shaped ring 37, by elastic deformation and prestressed. abuts against the interior surface 39 of the sealing ring 1. The U-shaped ring 37 presses, as a result of the pressure drop at the sealing area, against the side surfaces 8 or 9 of the groove and also against the interior surface 39 of the sealing ring.

The U-shaped ring 37 always continues to the sealing ring 1 and presses against the sealing ring in pressure-free state by the pre-stress of the U-shaped ring 37 and upon pressure drop over the sealing by the pressure distributions and forces occurring on U-shaped ring 37 depending on the configuration of the U-shaped ring 37 with the chamfer 43 and the side surfaces 41 and 42. The pressure distribution on the U-shaped ring 37 is evident from FIG. 11. As a functional requirement, the pressure force pressing U-shaped ring 37 against the sealing ring 1 preferably is higher than the frictional force existing between U-shaped ring 37 and the side surface 8 or 9 of the groove 2 when the sealing ring 1 and the U-shaped ring 37 move radially relative to the groove 2 in the member 3.

The fundamental requirement of this third embodiment is, accordingly, that the play and the leakage place which can occur between the sealing ring 1 and the side surfaces 8 or 9 of the groove 2 shall be sealed by one or several rings acting on the interior surface 39 of the sealing ring 1 and the side surface 8 or 9 of the groove 2 under a pressure-free state as a result of the pre-stress in the sealing ring or rings and with a pressure drop across the seal. As a result, the pressure always is able to hold the sealing ring 37 or rings against the sealing ring 1 to thereby overcome the frictional forces which can arise against the side surfaces 8 and 9 of the groove 2. This can, of course, be solved in different ways but the configuration according to FIGS. 10 and 11 shows an advantageous and preferred embodiment.

FIG. 11 shows how the U-shaped ring 37 through its side surface 41 seals against the side surface 8 of the groove 2. The difference between the axial pressure distribution 45 and the axial pressure distribution 46 gives the axial distribution 47, which through friction between the surfaces 41 and 8, acts to prevent the U-shaped ring 37 to radially follow the sealing ring 1 and also to seal between the surfaces 40 and 39 on the side of the groove 2 where the side surface 8 is positioned.

The difference between the radial pressure distributions 47 and 48 presses, with pressure distribution 49, the U-shaped ring 37 radially against the sealing ring 1 so that contact and sealing occurs between the surfaces 40 and 39. It is important that the groove space 2 through, for instance one or several holes 44, always has the same pressure on both sides of the U-shaped ring 37. The pressure distribution 49 must, for safe functioning, always provides such a high radially directed force that is greater that the friction force occurring when the sealing ring 1 and the U-shaped ring 37 move radially, thereby creating a radially directed frictional, force at the contact place between the side surface 41 of the U-shaped ring and the side surface 8 of the groove 2. A satisfactory and safe solution is obtained if the space 50 formed by the chamfer 43 of the U-shaped ring 37 is preferably formed substantially as long axially as radially as the contact surfaces between the surfaces 40 and 39 and about as long as the contact surface between the surfaces 41 and 8. One then does obtain good function up to a friction coefficient of about 1.0. The actual friction coefficient is dependent upon the chosen materials.

It is important in the embodiment of the type shown in the FIGS. 10 and 11, that the U-shaped ring 37 or corresponding sealing element retain its pre-stress so that it is pressed against the interior surface 39 of the sealing ring 1 over the entire life of the sealing. Also, during the entire life of the sealing, the side surfaces 41 and 42 abut against, or without large plays, and are positioned near the side surfaces 8 and 9 of the groove 2.

If the U-shaped ring is made of a setting-free material, the pre-stress in radial direction is maintained. In order to guarantee this, it can in certain cases be appropriate, to combine the U-shaped ring 37 with a further pre-stressed ring 38 formed of a substantial setting-free material such as steel or aluminum. The only reason for the choice of a semi-hard material, for instance nylon, instead of a hard material, for instance aluminum, is that the sealing takes place somewhat better against surfaces having rough or scratched surface structure. The reason for the choice of U-shaped ring, or the like, in a metallic material is safe pre-stress and a greater insensitivity to temperatures, media etc.

A sealing according to FIGS. 10 and 11 can be built with extremely small widths, for instance 2.5 mm, and extremely low groove depths, for instance 2.5 mm. One can then provide a groove without partition and mount the sealing ring 1 and the U-shaped ring 37, or the like, by forcing these into the groove in the same manner as for instance a tire is mounted onto a rim of a car. The essential requirement is that the diameter of the bottom 23 of the groove 2 is adapted for this and is not only adapted for the radial movements of the sealing 1 and the U-shaped ring 37.

The maximum contact pressure which can be used in a sealing device according to the invention varies with a number of factors. Among such factors are the combination of the sealing material and the opposite surface material in the contact surface, their respective surface finishes and wearing capability, and the lubricating qualities of the medium. With conventional soft and semi-hard seals, the contact pressure becomes about equal to the pre-stress plus the medium pressure. According to the present invention, not only can the same soft or semi-hard materials in the contact surface can be used, but also hard materials withstanding higher contact pressures and poorer opposite surfaces. More important is, however, that in the sealing device according to the present invention, the contact pressure can, as mentioned above, be affected and lowered. The pre-stress is relatively low but can be guided via choice of low values for average height ($h_m$), diameter change ($\Delta d$) and coefficient of elasticity (E). The medium pressure, which can provide a contribution to contact pressure, can be limited or eliminated by pressure balancing. By operating with low maximum contact pressure, good qualities are achieved and also the possibility of using unfavorable materials and surfaces as well as media having poor lubrication ability. A reason for accepting a higher contact pressure than what can be obtained, arises when the cost of the sealing should be decreased, but this does not exist in most cases since the embodiment according to FIGS. 10 and 11 already is of low cost.

Embodiments without pressure-unload can sometimes, under favorable sealing conditions, provide a good solution in spite of the fact that certain possible improvements are relinquished. The embodiment according to FIGS. 8 and 9 in hoisting crane is a typical such application In such unfavorable applications, where only low contact pressure can be accepted, one operates first with pressure balancing if the medium pressure is high, and secondly with a pre-stress pressure. Thus, the pre-stress pressure which then sets an upper limit for the average height ($h_m$) of the sealing ring 1 can provide the main part of the contact pressure that the material, surfaces, and lubrication conditions of the application, allow.

To reach low contact pressures, a low average height of the sealing ring is desired. The average height which can be achieved in practice depends first on the maximum gap 12 after allowed maximum wear between the members 3 and 4. Second, the thickness is determined by the manufacturing tolerances of the opposite members to be sealed. The maximum gap is also, to a high degree, dependent on the tolerances of the members, for instance the tube diameter of a cylinder.

The calculation of required thickness for the side surfaces of the sealing ring and its central part includes several parameters such as a gap, wear depths, tolerances but also stress calculations regarding the actual stresses on the sealing ring at high pressures. For diameters about 60–80 mm and above, it is, within the usual normal tolerances for cylindrical tubes, relatively easy to provide a favorable construction having sealing rings formed of steel. For diameters about 50 mm and below, results are improved if the sealing ring is made of a material having a lower coefficient of elasticity. Aluminum and its alloys having about 66% lower coefficient of elasticity are appropriate materials, but also certain high-alloy steels and also titanium, chromium, etc., can provide good results. In the case of piston rod sealing, the tolerance on the piston rod is normally about 2 tolerance degrees finer than for cylinder pipes, but at the same time the piston rod diameter is normally only about 45–63% of the tube diameter for a cylinder. Thus, there are reasons to consider also for piston rods having a diameter of 40 mm or less, the use of materials having a lower coefficient of elasticity than steel.

Principally, the material of choice in sealing rings is not limited to metal; instead; hard materials can function well, such as glass, ceramic materials and also relatively hard polymeric materials, preferably those having improved form stability and creeping qualities by reinforcement with fibers of different kinds. Tests have shown that the present sealing device operates well even with a very low circumferential pre-stress. Also materials having certain tendency to set or creep can therefore be used. The difference in temperature expansion must be compensated with pre-stress but this is seldom a problem.

A sealing device according to the present invention has primarily been developed in order to seal dynamically in connection with fluid techniques. Both linear movements and rotating movements can be sealed. The sealing device of the present invention can also provide a very appropriate static sealing in many cases where the requirements are high and special. Obvious applications are for cylinders, swivels, pistons in hydraulic pumps and motors, et. Within the process industry with petroleum, chemicals, foods etc., the invention has clear utility. For example, the sealing of pistons in internal combustion engines and compressors is also an appropriate application. In brake equipments of different kinds, and also in adjacent bearings where temperatures are very high, as well as for all other types of sealing places with extremely high or low temperatures and high pressures, there is an obvious need for the present invention. For instance, a great number of applications exist within aerospace, military, and energy technologies. The pre-stress and tolerances used are, of course, required to be adapted to each specific application.

Several alternative methods can be used for the manufacture of the sealing ring 1 and the spring washers 10, 11. The sealing ring in a piston sealing can be split if it is subjected to compressive stresses which can completely close a split and provide complete sealing if the two parting surfaces closely abut each other. Among many possible methods for forming the rings can be mentioned turning, profile rolled wire which is made circular and is welded, plastic forming, sintering and casting etc. Tempering and grinding follows thereafter for the temperable metals.

When the sealing members are made of very little material and thereby material cost is very low, it is of great importance that material waste be avoided, when, for example, metal cutting machinery such as a lathe is used. The manufacture with form-rolled wire is, from this point of view, interesting particularly for piston seals which necessarily would ordinarily not need to be welded. Particularly for larger diameters, it is possible to permit several sealing rings, spring washers, and U-shaped rings to have the same section, which accordingly can be made from the same form-rolled wire. The sealing rings have a very little section in relation to their diameter. The manufacture becomes special in many regards as to handling, setting, measuring, etc. Since the sealing ring and the other seal components of a seal readily conform to the shapes of the ports onto which they are mounted, then obviously a significant degree of ovality, non-planar configuration and twisting can be tolerated with respect to the unmounted parts. It is then generally not the diameter tolerances of the members which are significant, but rather the circumference of the slender elements.

Since the pre-stress in the sealing ring also is dependent on the circumference of the opposite member, the pre-stress in the sealing ring usually becomes more even than what the diameter tolerance of the opposite member indicates. This is particularly advantageous when using drawn cylinder tubes, the diameter tolerance of which to a great extent is caused by ovality, which means that the circumference of the pipe corresponds to a diameter in the central part of the tolerance area. Round drifts and fixtures must therefore mostly be used when manufacturing sealing rings and spring washers. There are also a number of advantageous possibilities to give the thin rings accurate diameter dimensions by plastic deformation when they are pressed over conical drifts or through conical tube tools.

The invention is of course not limited to the embodiments described above and shown on the drawings but can be varied in several ways within the scope of the claims.

I claim:

1. Sealing means for effecting a fluid-tight seal between two members respectively defining cylindrical, spaced, opposed surfaces movable relative to each other and defining a gap therebetween;

said sealing means including a sealing ring having the characteristics of being gap-less and formed of a hard material that even after long-time deformation with a stress less than its yield point springs back to its original dimensions, said sealing ring also being substantially non-deformable in cross-section in response to the maximum circumferential stress, less than its yield point, which is expected to be applied thereto during its intended use, said ring having a radial thickness in cross-section not exceeding about three millimeters and preferably less than one millimeter, the radial thickness of the cross-section of said ring being less than its axial length;

an annular recess in one of said opposed surfaces for receiving said sealing ring;

said sealing ring defining a contacting surface which, in the unstressed state of said sealing ring, has a circumference which, in relation to the circumference of the other of said opposed surfaces, requires the altering of said contacting surfaces's circumference by means of circumferential pre-stressing resulting primarily from the physical assembly of said sealing ring between said two members to a degree that causes its circumference to substantially equal that of said other opposed surface;

the difference in circumferences between said contacting surfaces of said sealing ring when unstressed and said opposed surface being such that the radial contact pressure exerted by said contacting surface upon said opposed surface in opposition to said sealing rings' circumferential pre-stressing urges said contacting surface into sealing engagement with the other of said opposed surfaces with a circumferential stress in said sealing means less than its yield point but sufficiently high to ensure that said contacting surface maintains at least a predetermined minimum contact pressure against the other of said opposing surfaces over substantially their entire mutual circumferential lengths notwithstanding the expected dimensional variations resulting from manufacturing tolerances, wear, deformation, non-circularity and other surface perturbations of said other opposing surface in response to the pressure acting thereon;

said minimum contact pressure being caused substantially only by said circumferential stressing of said sealing means.

2. A method of effecting a fluid-tight seal between two members respectively defining cylindrical, spaced, opposed surfaces movable relative to each other and defining a gap therebetween, said method comprising the steps of:

selecting a sealing ring which is gap-less and formed of a hard material having the characteristic that even after long-time deformation with a stress less than its yield point it springs back to its original dimensions, said sealing ring also being substantially non-deformable in cross-section in response to the maximum circumferential stress, less than its yield point, which is expected to be applied thereto during its intended use, said ring being selected to have a radial thickness in cross-section not exceeding about three millimeters and preferably less than one millimeter and with said radial thickness being less than the axial length of the ring's cross-section;

forming an annular recess in one of said opposed surfaces for receiving said sealing ring;

forming said sealing ring to define a contacting surface which, in the unstressed state of said sealing ring, has a circumference which, in relation to the circumference of the other of said opposed surfaces, requires the altering of said contacting surface's circumference by means of circumferential pre-stressing resulting primarily from the physical assembly of said sealing ring between said two members to a degree that causes its circumference to substantially equal that of said other opposed surface, the difference in circumferences between said contacting surface of said sealing ring when unstressed and said opposed surface being such that the radial contact pressure exerted by said contacting surface upon said opposes surface in opposition to said sealing rings' circumferential pre-stressing urges said contacting surface into sealing engagement with the other of said opposed surfaces with a circumferential stress in said sealing ring less than its yield point but sufficiently high to ensure that said contacting surface maintains at least a predetermined minimum contact pressure against the other of said opposing surfaces over substantially their entire mutual circumferential lengths notwithstanding the expected dimensional variations resulting from manufacturing tolerances, wear, deformation, non-circularity and other surface perturbations of said other opposing surface in response to the pressure acting thereon;

said minimum contact pressure being caused substantially only by said circumferential stressing of said sealing means.

3. The sealing means of claim 1 in which said predetermined minimum contact pressure p of the ring diameter is determined by its d, its cross-sectional area A, its width b, its diameter change under stress $\Delta d$, and its coefficient of elasticity E in accordance with the relationship:

$$p = 2A \cdot \Delta d \cdot E / b \cdot d^2.$$

4. The sealing means of claim 1 in which said sealing ring is formed of metal.

5. The sealing means of claim 1 in which said sealing ring is formed of a dimensionally stable material of the group consisting essentially of metal, ceramics, and dimensionally stable polymerics.

6. The sealing means of claim 1 in which said ring is chamfered along at least one of the edges of its said contacting surface.

7. The sealing means of claim 1 which further includes a resilient member positioned between said sealing ring and the bottom of said annular recess.

8. The sealing means of claim 1 which further includes a resilient member positioned between a side wall of said sealing ring and side wall of said annular recess in said one opposed surface.

9. The sealing means of claim 8 in which said resilient member comprises a spring.

* * * * *